Figure 3:
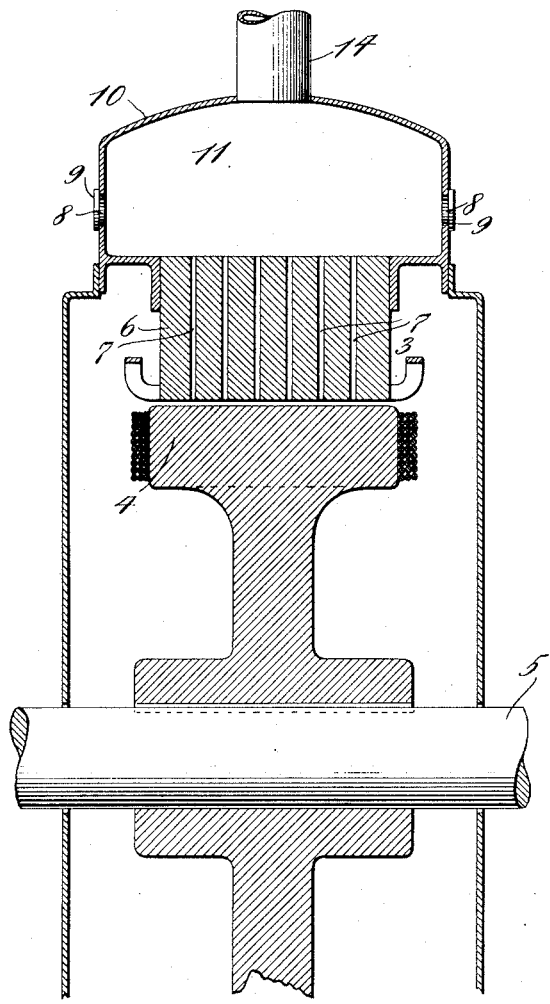

F. G. BAUM.
METHOD OF AND APPARATUS FOR COOLING ELECTRICAL GENERATORS AND MOTORS.
APPLICATION FILED SEPT. 7, 1910.
987,536.
Patented Mar. 21, 1911.
2 SHEETS—SHEET 1.
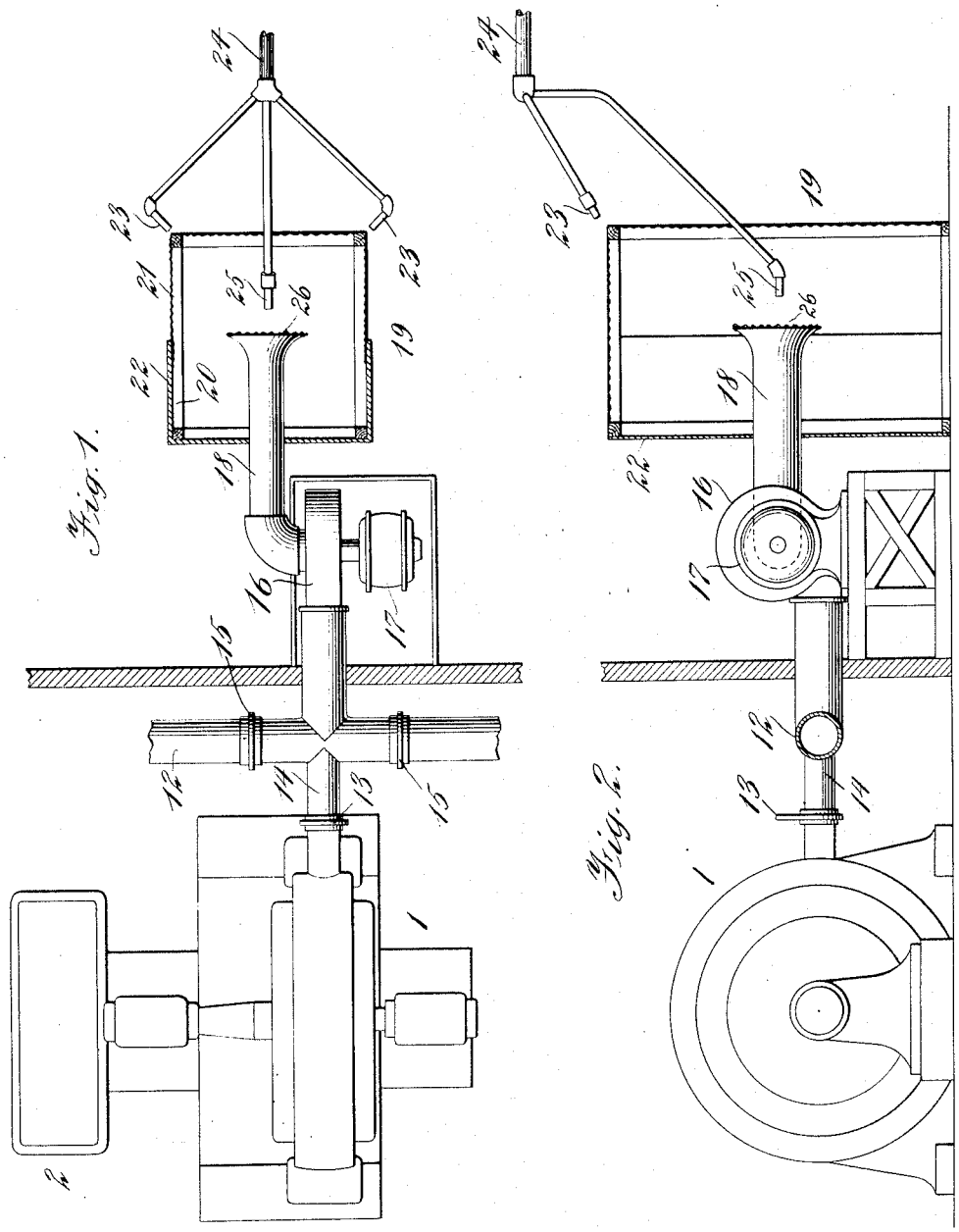

F. G. BAUM.
METHOD OF AND APPARATUS FOR COOLING ELECTRICAL GENERATORS AND MOTORS.
APPLICATION FILED SEPT. 7, 1910.

987,536.

Patented Mar. 21, 1911.

2 SHEETS—SHEET 2.

UNITED STATES PATENT OFFICE.

FRANK GEORGE BAUM, OF SAN FRANCISCO, CALIFORNIA.

METHOD OF AND APPARATUS FOR COOLING ELECTRICAL GENERATORS AND MOTORS.

987,536.   Specification of Letters Patent.   Patented Mar. 21, 1911.

Application filed September 7, 1910. Serial No. 580,816.

*To all whom it may concern:*

Be it known that I, FRANK G. BAUM, a citizen of the United States, residing at San Francisco, in the county of San Francisco and State of California, have invented certain new and useful Improvements in Methods of and Apparatus for Cooling Electrical Generators and Motors, of which the following is a full, clear, and exact description.

This invention relates to a method and apparatus for cooling armatures of electrical generators and motors, and the like, and has for one of its objects the provision of apparatus adapted for this purpose which can be cheaply constructed, is economical in operation, and much more efficient than devices of this character as heretofore made.

As usually constructed, the revolving element in a generator or motor is so arranged that it will drive some air through the field and armature vent holes. In this case air is taken in having a temperature substantially that of the surrounding atmosphere; and there is very little effective pressure whereby to force it through the vent holes to properly cool the machine. This method is hence very inefficient; since the air cannot be properly driven through all of the holes; and by reason of the fact that the air is not at the right temperature to take up heat, this being especially the case in the warm period of the year, the air then being generally quite hot. Further, the air carries but little moisture in summer, particularly in certain localities; and the amount of heat which the air can take up depends largely upon the moisture which it carries.

The herein described invention aims to materially reduce the temperature of electric current generating apparatus and the like, preventing such apparatus from running hot and thereby adapting said apparatus to carry a higher load.

The principal objects of my invention are therefore, first, to force air at any desired pressure through all of the vent holes of the laminations coming in contact with the armature coils, and finally with the field coils; and second, to reduce the temperature of the supplied air below the temperature of the surrounding air and to add water to the supplied air thereby adapting it to more readily take up heat.

Other objects of my invention will be hereinafter set forth and more particularly pointed out in the appended claims.

Referring to the drawings which form a part hereof: Figure 1 is a plan of one embodiment of my improved cooling arrangement which is adapted for carrying out my method. Fig. 2 is a section taken through the cooling apparatus; and Fig. 3 is a section taken through a portion of the armature to show the path of the air therethrough.

Like characters of reference have been used to designate like parts throughout the several views.

The generator has been broadly designated 1, being driven by any suitable prime mover 2.

In this exemplification of my invention, the armature 3 is stationary and the field 4 rotatable therein, being mounted on shaft 5 in the usual manner. The armature laminations 6 are provided with the usual vents 7 therethrough and in applying my apparatus to generators of this type, as usually constructed, I prefer to close the regular vent holes 8 by suitable covers 9, utilizing the space in the portion 10 of the armature casing adjacent the peripheral surface of the laminations as a conduit or receptacle wherein air from the blower may be held under pressure; such conduit being designated 11. This air space or conduit is connected to an air main 12 in any approved manner, a suitable gate 13 being positioned in the air inlet 14 which connects the conduit 11 and air main 12. The air main 12 may extend along a line of generators so that air under pressure may be supplied thereto and suitable gates may be disposed in this main to afford control of such supply. A suitable blower 16 delivers air under pressure to the air main and may be driven in any proper manner as by a motor 17. The blower used in this instance is of the centrifugal type, and the suction tube 18 thereof extends into a casing which I have broadly designated 19. This casing is formed by covering a suitable wooden or other frame 20 with coarse cloth, burlap or other suitable material 21 on one or more sides thereof, the remainder of the casing being covered with wood, sheet metal or other material 22. The casing 19 should preferably be of relatively considerable size, and the burlap or cloth covering thereof is adapted to be kept continuously moist by spraying water thereon from one or more fine spray nozzles 23, these nozzles delivering water from the water supply pipe 24. I prefer to so dispose the nozzles 23 that the spray therefrom may encounter at least two surfaces of the burlap or cloth cover. In addition to the nozzles 23 which deliver upon the outer surfaces of the reticulated covering, I also introduce a nozzle 25 directly into the body of the receptacle or casing 19, the entrance to which is also covered by cloth, or the like 26, this latter nozzle being directed toward the opening of the pipe 18 so that very fine particles of moisture may be entrained by the air rushing into the said pipe. By thus continuously moistening the reticulated surface through which the air is forced to pass, such air is induced to absorb moisture practically to the point of saturation; while the nozzle 25 inside of the casing adds moisture in the form of minute particles to the already saturated air, such particles being entrained thereby and carried along in suspension. This air is forced through the blower and is delivered to the conduit 11 which extends around the armature or like part; and as it approaches the heated parts of the machine, more particularly immediately after it has entered the said conduit, the suspended particles will be evaporated and in evaporating will of course take up heat.

Assuming now that the air be delivered to the blower under the most adverse conditions, to wit, in summer when the temperature of the air may approximate 102 degrees F.; at this temperature a cubic foot of air saturated with moisture will carry .00299 pounds of water. At a temperature of 152°, which under such conditions might be the temperature in the vicinity of the armature, the same cubic foot of air will, when saturated, carry .0107 pounds of water. The difference between the water carried by the air at 102° and that carried by the air at 152°, is hence approximately .0077 pounds per cubic foot of air. In other words, .0077 pounds of water can be added to the saturated air at 102° and such water can be carried to the machine entrained in the air. If the temperature of the machine is, let us say, 152°, all the water so held in suspension will be evaporated; the temperature of the air being raised to 152°, and the air being again completely saturated at that temperature. The amount of heat per pound of air which the air with the water in suspension in raising 50° F. would absorb, would be:—.78 of a heat unit per cubic foot of such air, and 7.45 heat units for the water in suspension at 102°, such water being evaporated at 152°. The heat units absorbed by the water are therefore nearly ten times the heat units absorbed by the air in raising this 50°.

The advantage of using moisture to take up heat units from a heated generator is therefore relatively enormous, as against merely partially saturated air. A 10,000 K. W. generator may have a heat loss of perhaps 250 K. W., or about 250×3412=853,000 heat units per hour. Assuming that each cubic foot of air and added moisture can take up four heat units, there would be required about 213,000 cubic feet of air per hour, or approximately 3550 cubic feet of air per minute. The air would, in this case, be only half saturated; but it is well to be on the safe side, and for this reason I prefer to increase the quantity of air two or three times, and reduce the quantity of water in suspension correspondingly which gives the same result and which eliminates any possible danger of precipitating moisture in the generator. As a result of this, a large kilowatt capacity is gained for but a small expenditure of power.

Another way of considering the results obtained is as follows: Assuming that dry air be supplied at a temperature of 102°, and that this air be caused to evaporate water so that it will have a 10% saturation; each cubic foot will then carry about .0003 pounds of water. The British thermal units absorbed by this amount of water would be .0003×996, or about .29 heat units. As the heat required to evaporate this water must come from the cubic foot of air itself and as the cubic foot of air weighs about .07 lbs. at this temperature, and has a specific heat of .24, it will be readily seen that the resultant drop in temperature in the mixture will be very appreciable, to wit, about 18°. Of course if the air is not dry, and has, let us say, a humidity of 50%, if we add 10% more moisture, bringing the humidity up to 60, the resultant drop in temperature will be the same.

It is of the utmost importance of course that but certain definite amounts of water should be entrained, as otherwise moisture might be deposited upon and injure the coils. As a result of drawing the air rapidly through the coarse wetted cloths, which are kept wet by the fine spray, the air evaporates a large portion of this moisture and the drop in temperature in this air from this source is also very material.

Having described my invention, what I claim, is:

1. A method of cooling electric generators which consists in directing a current of air in a predetermined direction, saturating such current of air with moisture, injecting a predetermined amount of water in the form of particles into said air current whereby such water may be entrained therein, supplying said air under pressure to a conduit disposed adjacent to and heated by the parts to be cooled, completely evaporating the said entrained particles of water before said particles emerge from said conduit by the heat of the parts to be cooled and thereafter conducting the air so freed from entrained moisture past the said parts.

2. In combination, a conduit, a device for forcing a cooling medium through said conduit, apparatus for introducing vaporizable material into a cooling medium whereby to saturate said medium and thereby reduce the temperature thereof, spray-forming apparatus for introducing into the mass of saturated medium a predetermined excess of said material in the form of minute particles, and an electric appliance having heat emitting parts which are to be cooled disposed sufficiently adjacent said conduit to completely evaporate said predetermined excess of vaporizable material while the latter is within the confines of the conduit, said conduit having the exhaust opening thereof arranged to deliver the dry cooling medium past the said parts.

In witness whereof, I subscribe my signature, in the presence of two witnesses.

FRANK GEORGE BAUM.

Witnesses:
LARS JORGENSEN,
N. M. PORTER.